(12) United States Patent
Linebarger et al.

(10) Patent No.: US 8,756,046 B2
(45) Date of Patent: *Jun. 17, 2014

(54) GENERATION OF CODE FROM A GRAPHICAL MODEL

(75) Inventors: Darel Allen Linebarger, Southborough, MA (US); Haihua Feng, Sherborn, MA (US); Ramamurthy Mani, Wayland, MA (US); Donald Paul Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,915

(22) Filed: Feb. 6, 2012

(65) Prior Publication Data

US 2012/0131545 A1    May 24, 2012

Related U.S. Application Data

(63) Continuation of application No. 11/841,917, filed on Aug. 20, 2007, which is a continuation of application No. 11/028,141, filed on Dec. 30, 2004, now Pat. No. 7,974,825.

(60) Provisional application No. 60/611,627, filed on Sep. 20, 2004.

(51) Int. Cl.
*G06G 7/62* (2006.01)

(52) U.S. Cl.
USPC .......................................................... 703/13

(58) Field of Classification Search
None
See application file for complete search history.

(56) References Cited

U.S. PATENT DOCUMENTS

| | | |
|---|---|---|
| 5,586,325 A | 12/1996 | MacDonald et al. |
| 6,173,438 B1 | 1/2001 | Kodosky et al. |
| 6,282,699 B1 | 8/2001 | Zhang et al. |
| 6,437,805 B1 | 8/2002 | Sojoodi et al. |
| 7,275,026 B2 | 9/2007 | Mani et al. |
| 7,313,449 B1 | 12/2007 | Ciolfi et al. |
| 7,331,037 B2 | 2/2008 | Dickey et al. |
| 7,509,244 B1 | 3/2009 | Shakeri et al. |
| 2002/0188928 A1 | 12/2002 | Szpak et al. |
| 2003/0016234 A1* | 1/2003 | Mani et al. ................ 345/621 |
| 2004/0208193 A1 | 10/2004 | Orofino et al. |
| 2004/0210685 A1 | 10/2004 | Orofino et al. |
| 2005/0055666 A1 | 3/2005 | Kornerup et al. |
| 2006/0064670 A1 | 3/2006 | Linebarger et al. |
| 2009/0002371 A1 | 1/2009 | Linebarger et al. |

OTHER PUBLICATIONS

Hunt, N. "IDF: A graphical data flow programming language for image processing and computer vision", 1990, IEEE, pp. 351-360.*
Licko et al. "MATLAB/Simulink Based Methodology for Rapid-FPGA-Prototyping" FPL 2003, LNCS 2778, pp. 984-987.*

(Continued)

*Primary Examiner* — Suzanne Lo
(74) *Attorney, Agent, or Firm* — Nelson Mullins Riley & Scarborough LLP

(57) ABSTRACT

A method and system are provided for generating code from a graphical model in a graphical modeling environment. The graphical model includes at least one signal having a data size, a data dimensionality, or both that can vary from a first time instance to a second time instance as the model executes. The size and dimensionality of the signal can vary without the use of a graphically rendered connection to convey the size and dimension information to a block associated with the signal.

19 Claims, 9 Drawing Sheets

(56) References Cited

OTHER PUBLICATIONS

Allen, Eric et al., "Interactive Object-Oriented Simulation of Interconnected Power Systems Using Simulink," IEEE Transactions Education, vol. 44(1):87-95 (2001).

Bell, Ian et al., "Integration of Hardware into the LabVIEW Environment for Rapid Prototyping and the Development of Control Design Applications," IKACC Control 2004 Mini Symposia, pp. 79-81 (2004).

Cordy, James R. et al, "GVL: A Graphical, Functional Language for the Specification of Output in Programming Languages," IEEE International Conference on Systems, Man and Cybernetics, pp. 11-22 (1990).

Hunt, Neil, "IDF: A graphical data flow programming language for image processing and computer vision," IEEE International Conference on Systems, Man and Cybernetics, pp. 351-360 (1990).

Lick?, Miroslav et al., "MATLAB/Simulink Based Methodology for Rapid-FPGA-Prototyping," P.Y.K. Cheung et al., (Eds.), Lecture Notes on Computer Sience, Field-Programmable Logic and Applications, Springer-Verlag, pp. 984-987 (2003).

National Instruments, "LabVIEW User Manual," National Instruments Corporation (2003).

Radiolab 3G, "The Easier Way to 3G Design Success," RadioScape Ltd. (2003).

Radioscape, "Simulation Drive Testing in Wireless Communications Systems," RadioScape Ltd. (2003).

SIGNALogic®, "Real-Time Composer™ Visual Environment," retrieved online at http://www.signalogic.com/index.pl?page=vis_dsp (2004).

SIGNALogic®, "DSPower® Real-Time Code Generator," retrieved online at http://www.signalogic.com/index.pl?page=rtcg (2004).

The MathWorks, "Simuilink® Model-Based and System-Based Design, Using Simulink, Version 4," The MathWorks Inc., (2001).

The MathWorks, "Simulink, Model-Based and System-Based Design, Using Simulink, Version 5," (2002).

The MathWorks, "Simulink, Simulation and Model-Based Design, Writing S-Functions, Version 6," The MathWorks, Inc., (2005).

Vogel, Thomas, "Simulink, sfunction with variable sized outputport possible?" retreived online at: http://www.mathworks.com/matlabcentral/newsreader/view_thread/52973 (2003).

Woodward, Mike, "Getting Graphical in 3G Wireless Designs," CommsDesign, The MathWorks (2003).

Woodward, Mike, "RadioLab 3G—a toolbox for 3G applications," pp. 1-5.

International Preliminary Report on Patentability for Application No. PCT/US2005/033846, 14 pages, dated Nov. 3, 2006.

International Search Report for Application No. PCT/US2005/033846, 4 pages, dated Feb. 28, 2006.

European Office Action for Application No. 05798628.3, 13 pages, dated Apr. 13, 2012.

Decision to refuse a European Patent Application for Application No. 05798628.3, 16 pages, dated Nov. 29, 2012.

Woodward, Michael, "Getting graphical in wireless 3G designs," International Signal Processing Conference, 3 pages (2003).

* cited by examiner

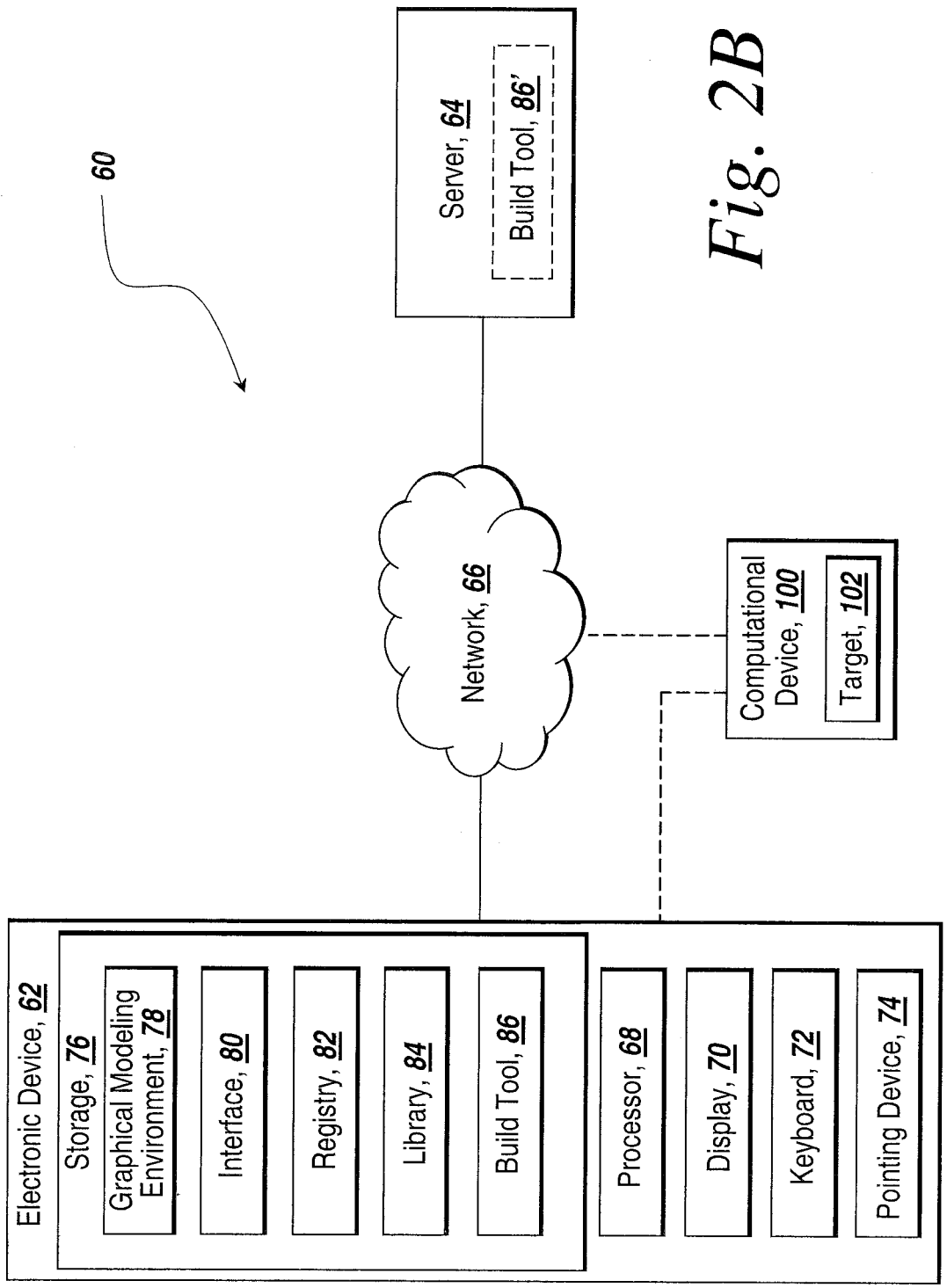

GENERATION OF CODE FROM A GRAPHICAL MODEL

REFERENCE TO RELATED APPLICATION

This application is a continuation of U.S. patent application Ser. No. 11/841,917, filed Aug. 20, 2007, entitled: "GENERATION OF CODE FROM A GRAPHICAL MODEL", which is a continuation of U.S. patent application Ser. No. 11/028,141, filed Dec. 30, 2004, entitled "GENERATION OF CODE FROM A GRAPHICAL MODEL", which claims priority to U.S. Provisional Patent Application Ser. No. 60/611,627, filed Sep. 20, 2004, entitled "Dynamic Changes to Signal Data Dimensionality in an Executable Block Diagram," the contents of these applications are hereby incorporated herein by reference.

TECHNICAL FIELD OF THE INVENTION

The present invention generally relates to data processing and, more particularly, to code generated from a graphical model environment having at least one signal with variable data size and dimensionality.

BACKGROUND

Various classes of graphical models describe computations that can be performed on computational hardware, such as a computer, microcontroller, FPGA, and custom hardware. Classes of such graphical models include time-based block diagrams such as those found within Simulink® from The MathWorks, Inc. of Natick, Mass., state-based and flow diagrams, such as those found within Stateflow® from The MathWorks, Inc. of Natick, Mass., data-flow diagrams, circuit diagrams, and software diagrams, such as those found in the Unified Modeling Language. A common characteristic among these various forms of graphical models is that they define semantics on how to execute the diagram.

Historically, engineers and scientists have utilized graphical models in numerous scientific areas such as Feedback Control Theory and Signal Processing to study, design, debug, and refine dynamic systems. Dynamic systems, which are characterized by the fact that their behaviors change over time, or the fact that their states change or the fact that their behaviors change due to a system environment, are representative of many real-world systems. Graphical modeling has become particularly attractive over the last few years with the advent of software packages such as Simulink® from The MathWorks, Inc. of Natick, Mass. Such packages provide sophisticated software platforms with a rich suite of support tools that makes the analysis and design of dynamic systems efficient, methodical, and cost-effective.

A dynamic system, either natural or man-made, is a system whose response at any given time is a function of its input stimuli, its current state, the current time, and other input parameters. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build graphical models of dynamic systems in order to better understand system behavior as it changes with the progression of time. The graphical models aid in building "better" systems, where "better" may be defined in terms of a variety of performance measures such as quality, time-to-market, cost, speed, size, power consumption, robustness, etc. The graphical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of graphical models in the development, analysis, and validation of dynamic systems.

Graphical modeling environments such as Simulink®, assist in simplifying the process of designing, simulating, and implementing dynamic systems. A graphical model is a representation of a real-world system through a graph containing nodes (i.e. blocks) interconnected by arcs (i.e. lines). Blocks are functional entities that perform mathematical operations, transformations or both on the data and information being processed by the system. The lines, often referred to as signals in the art, represent streams of information, such as data, data types, timing information, and control information, flowing into, out of, and between various blocks. Signals in current graphical model environments have a number of attributes, such as data dimensions (i.e., signal dimensionality) and data type amongst other attributes. Signal data can be organized into a one-dimensional data structure for example, a vector or can be organized into a two-dimensional data structure, for example, a matrix, or can be organized into a three-dimensional or four-dimensional data structure.

As a model in a graphical modeling environment executes, signal dimensionality must be known so that signals can be properly processed within each block. If signal dimensionality is allowed to vary while the model executes, the time varying information regarding signal dimensions must somehow propagate along with the signal values. Using existing technology, the signal dimensions can propagate explicitly through additional lines in the model. The present invention is concerned with systems and methods that allow signal dimensionality to propagate implicitly.

For implicit propagation, there is no need for the user to provide explicit means in the model to handle the ongoing propagation of signal dimensions. Each block is able to query somehow for its signal dimensions at each time instant. In this case of implicit signal dimension propagation, each signal with variable dimensions has a mechanism by which each block connected to that signal has a way to get and/or set that signal's dimensionality at each time instant. For example, each block reading a variable sized signal on an input port needs a way to get that signal's dimensionality. Similarly, blocks that write to a dynamic sized signal on their output need a set method for the signal's dimensions. This "dimensionality attribute" does not require a line of its own and need not appear as a signal in any way in the model. This is not to say that it would be impossible for the user to have some kind of visible affordance related to a dynamically sized signal; it is just not a requirement that this dimensionality information be explicit in the model.

Moreover, the time varying nature of a signal's variable data dimensionality implies that memory requirements for input and output buffers associated with blocks that operate on such signals might increase, decrease, or both, as the model executes. To accommodate a signal's variable data dimensionality it is often the case that a worst case memory allocation occurs before the model begins execution so that memory sufficient for each signal's maximum data size is pre-allocated. Alternatively, an engine and code generated from the model can provide for run-time dynamic memory allocation to accommodate the memory requirements of a signal as its size varies during execution of the model. As an example of dynamic memory allocation, container objects from a C++ Standard Template library can be used as signals in a graphical modeling environment. These objects have dynamic memory allocation built into them.

In graphical models with dynamically sized signals using a worst case memory allocation scheme, the actual size of the signal buffers remains fixed and the entire structure is filed with relevant data and irrelevant data. The relevant data being the data on which a block is to carry out an operation on. The remainder of the data is ignored by blocks that use that buffer.

Graphical modeling environments, such as the technical computing environment of MATLAB® from the MathWorks, Inc. of Natick, Mass., can provide a "model-based design" approach to designing an implementation. The term "model-based design" is used to refer to a graphical model acting as a design. A model-based design may be used as a design specification for an implementation, such as an implementation of an algorithm in hardware circuitry or the implementation of code to run on a computer. A graphical block diagram modeling environment can produce designs in graphical block diagram form to specify computations that can be performed on computational hardware such as a general purpose processor, microcontroller, DSP, FPGA, PLD, or ASIC. That is, a model-based design is well suited for use as a design specification, for the model-based design can drive the building process of an implementation of the design. For instance, the model-based design can act as a specification from which to automatically generate code from a graphical model in a graphical modeling environment.

Although a graphical modeling environment, such as Simulink® from the MathWorks, Inc. of Natick, Mass., provides graphical block diagram models for the design and code of the computations to execute on computational hardware, the graphical block diagram model design does not provide for the design of the implementation of a model having one or more signals with dynamic dimensioning without using graphical connections in the model to convey the dimension information. The many applications that can benefit from dynamically sized signals are more conveniently modeled if the dynamic sizes did not have to be explicitly handled by the person building the model.

SUMMARY OF THE INVENTION

The present invention provides systems and methods to automatically generate code from a design in a graphical block diagram model having a signal with dynamic data dimensionality and size for execution on one or more target devices or platforms. The model conveys the data size and dimensionality information to associated blocks without the use of graphically rendered connections to do so. The illustrative embodiment of the present invention enables the generation of code from a graphical model having a signal with a data dimensionality and data size that are capable of varying during execution of the block diagram in a graphical model environment without using graphical connections to convey the data size and dimension information to a block associated with the signal. In this manner, the data dimensions and data size of a signal can vary to accommodate the dynamic nature of data output by a function and comply with the attributes of the signal.

According to one aspect, a computer-readable medium may contain instructions executable by at least one processor. The computer-readable medium may include one or more instructions for providing an interface to permit a user to build or edit a graphical model that includes at least one block and a number of connections, where each of the connections may represent a signal received by or output from the at least one block; one or more instructions for receiving information regarding one of the signals, in the graphical model, that has a size or dimensionality that can change during execution of the graphical model; one or more instructions for visually presenting the graphical model, where a single one of the connections corresponding to the one signal may implicitly convey the size or the dimensionality of the one signal that can change during execution of the graphical model; and one or more instructions for generating code from the graphical model.

According to another aspect, a computer-implemented method may include receiving a graphical model that includes a number of blocks and a number of connections, where each of the connections may represent a signal received by or output from one of the blocks; identifying one of the signals, in the graphical model, that has a size or dimensionality that can change during execution of the graphical model; visually presenting the graphical model, where a single one of the connections corresponding to the identified signal may implicitly convey the size or the dimensionality of the identified signal that can change during execution of the graphical model; and generating code from the graphical model.

According to yet another aspect, one or more devices may include a display, a memory, and a processor. The memory may store a graphical model that includes at least one block and a number of connections. Each of the connections may represent a signal received by or output from the at least one block. The processor may receive information regarding one of the signals, in the graphical model, that has a variable size and a variable dimensionality that are capable of changing during execution of the graphical model, visually present the graphical model on the display, where a single one of the connections corresponding to the one signal may implicitly convey information regarding the variable size and the variable dimensionality of the one signal, and generate code from the graphical model.

According to a further aspect, a device may include means for receiving a graphical model that includes a number of blocks and a number of connections, where each of the connections may represent a signal received by or output from one of the blocks; means for identifying one of the signals, in the graphical model, that has a size and dimensionality that are capable of changing during execution of the graphical model; means for visually presenting the graphical model, where a single one of the connections corresponding to the identified signal may implicitly convey the size and the dimensionality of the identified signal that are capable of changing during execution of the graphical model; and means for generating code from the graphical model.

BRIEF DESCRIPTION OF FIGURES

An illustrative embodiment of the present invention will be described below relative to the following drawings in which like reference characters refer to the same parts throughout the different views.

FIG. 2B illustrates another environment suitable for practicing the illustrative embodiment of the present invention.

DETAILED DESCRIPTION

Figure 1:
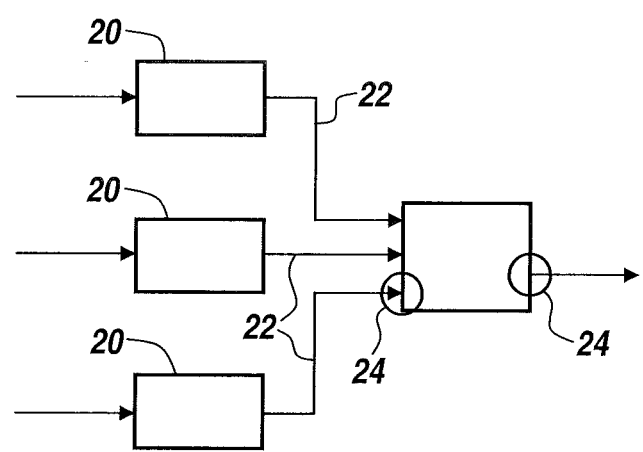
FIG. 1 illustrates components of an exemplary graphical model environment.

Before starting the discussion below, it is helpful to clarify the meaning of the term signal. A signal is used herein as used for Simulink®. Specifically, signals represent systems of values. A signal type refers to a signal that is a member of a class or classes of signals. That is, a signal is a set of values that propagates along a line in a graphical modeling environment. Signals can take on different values as the model executes. Signals have attributes such as dimensionality, data type, sample rate, etc.

In more detail, at each time instant, the value of a signal is in general an N-dimensional array, where N can take on any positive integer value. For example, a scalar signal is represented by a scalar value at each time instant. Thus at time $t_0$, a scalar signal value could be 3.14. Likewise, a 1-dimensional signal is represented as a vector at each time instant. For example at time $t_0$, a 1-dimensional signal value could be $$\begin{bmatrix} 3 \\ 4.2 \\ 5 \end{bmatrix},$$

further, a 2-dimensional signal is represented as a matrix at each time instant. For example at time $t_0$, a 2-dimensional signal could be $$\begin{bmatrix} 2 & 4 \\ 2.4 & 4.2 \\ 2.7 & 7.4 \\ 3.1 & 1.3 \end{bmatrix}.$$

Still further, an "N"-dimensional signal is represented as an N-dimensional array at each time instant.

Furthermore, associated with each dimension of a signal is a size. For example, the size of the 1-dimensional signal discussed above is three. The 2-dimensional signal discussed above has a size of four for the first dimension and a size of two for the second dimension.

A signal of a block diagram model according to the present invention has associated therewith data whose dimensionality, size, or both is allowed to vary. Examples of such a signal include, but are not limited to:

1). A 1-dimensional signal that changes from a size of four to a size of eight and then to a size of six;
2). A signal that changes from a 1-dimensional having a signal size of nine to a 2-dimensional signal of a size of 3×3;
3). A signal that changes from a 2-dimensional having a signal size of 8×2 to a 2-dimensional signal having a size of 40×2; and
4). A signal that changes from a 2-dimensional signal having a size of 4×2 to a 4-dimensional signal having a size of 3×4×5×10.

The illustrative embodiment of the present invention facilitates the use of variable data dimensionality attributes of signals in code generated from a graphical model environment. The method and system of the illustrative embodiment allows a programmer in the graphical model environment to define a first signal type having data dimensions, data size, or both that vary as a block diagram executes in the graphical model environment without having to use graphical connections to convey the dimension information. The method and system of the illustrative embodiment allows generation of code from the block diagram for execution by a processor outside of the graphical modeling environment.

The illustrative embodiment of the present invention provides systems and methods for automatically generating code from a block diagram model to implement a signal having a variable data dimensionality free of a graphical connection used to convey the dimension information and to build code to run on components represented by a block diagram model design. In a graphical modeling environment, block diagram models can be produced to represent a design for the implementation of code on a multiple component computational hardware device. A code building tool is used to generate code from the block diagram model based on the design represented by the block diagram model. The code building tool generates code to implement a signal having a variable data dimensionality and size, from a model free of a graphical connection to convey the dimension information as defined in the block diagram model.

A graphical model of a dynamic system is represented schematically as a collection of blocks interconnected by lines that are either visible on a display (i.e., graphical connection), by lines that are not visually displayed, or both. The lines represent the connection as opposed to the signals themselves. Each block represents an elemental dynamic system. A line emanating at one block and terminating at another can signify that the output of the first block is an input to the second block that an output of the second block is an input to the first block, or a bi-directional signal between a bi-directional port of the first block and a bi-directional port of the second block. Each distinct input or output on a block is referred to as a port.

Signals correspond to the time-varying quantities represented by each line connection and are assumed to have values at each time instant. The source block of a signal writes to the signal at a given time instant when its system equations are solved. The destination blocks of this signal read from the signal when their system equations are being solved. FIG. 1 illustrates exemplary components of a graphical model in a graphical modeling environment. The graphical model includes a plurality of blocks 20, signals 22 and ports 24 that are interconnected. Those skilled in the art will recognize that the term "blocks" does not refer exclusively to elemental dynamic systems but may also include other modeling elements that aid in readability and modularity of graphical models.

Figure 2A:
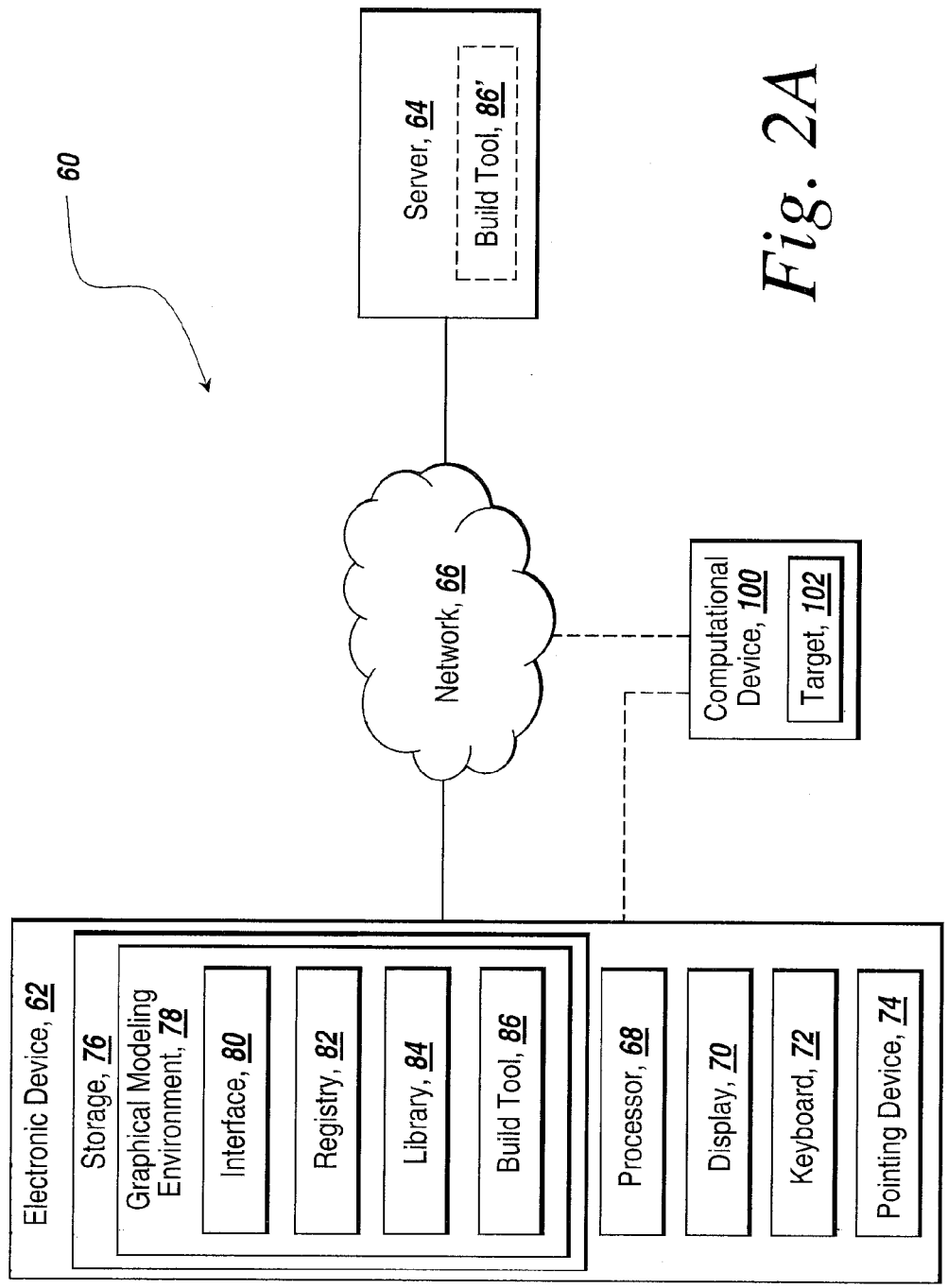
FIG. 2A illustrates an environment suitable for practicing the illustrative embodiment of the present invention.

The generation or creation of the graphical model illustrated in FIG. 1 is accomplished, for example, using system 60 illustrated in FIG. 2A. System 60 includes an electronic device 62, a network 66, and optionally, another electronic device for example server 64. Electronic device 62 includes, amongst other hardware and software components, GUI tools 80 and build tool 86 in graphical model environment 78. One example of a graphical model environment is Simulink® from The MathWorks, Inc. of Natick, Mass. The suite of GUI tools allows users to draft a graphical model on one or more corresponding windows. The GUI tools 80 can include a block palette, wiring line connection tool (i.e. signal connector tool), annotation tool, formatting tool, attribute editing tool, save/load tool and publishing tool, and other tools depending on a user's need and the graphical modeling environment 78.

The block palette is a library 84 of pre-defined blocks available to the user when building or editing a graphical model. Individual users may be able to customize this palette to: (a) reorganize blocks in some custom format, (b) delete blocks they do not use, and (c) add custom blocks they have designed. The palette allows blocks to be dragged through some human-machine interface (such as a pointing device 74 or keyboard 72) from the palette on to the window (i.e., model canvas). The graphical version of the block that is rendered on the canvas is called the icon for the block. There may be different embodiments for the block palette including a tree-based browser view of all of the blocks. Further details of system 60 are discussed below in more detail with reference to FIG. 2B.

The wiring line connection tool (not shown) allows users to draw directed lines representing a signal that connect the ports of blocks in the model's window. Lines may also be added through various mechanisms involving human-machine interfaces such as a mouse or a keyboard. Simulink® also provides various forms of auto-connection tools that connect blocks automatically on user request to produce an aesthetically pleasing layout of the graphical model (especially those with high complexity with large numbers of blocks). The annotation tool allows users to add notes and annotations to various parts of the palette for a graphical model. The formatting tool enables users to perform various formatting operations that are generally available on any document editing tool. These operations help pick and modify the various graphical attributes of the graphical model (and constituent blocks) such as include font-selection, alignment & justification, color selection, etc.

The graphical model and all the blocks within the graphical model generally have a set of functional attributes that are relevant for the execution of the model and code-generation from the model for execution by a computational hardware device outside the graphical modeling environment. The attribute editing tool provides GUIs that allow these attributes to be specified and edited. The save/load tool allows a created graphical model to be saved. The saved model can be reopened in the editor at some later juncture through a load mechanism. Simulink® also allows users to save blocks including pre-constructed subsystems into a separate class of block-diagrams called libraries. Such libraries facilitate reuse of the same block in a number of other block-diagrams. The load/save mechanism is specially equipped to handle loading and saving of blocks in a block-diagram that actually reside in libraries.

A typical base class for a block may be represented as:

```
class Block {
    public:
        // Access methods for setting/getting block data
        ...
        // Methods for block editing
        virtual ErrorStatus BlockDrawIcon( );
        virtual BlockParameterData BlockGetParameterData( );
        ...
        // Methods for block compilation
        ...
        // Methods for block execution
        ........................................
        virtual ErrorStatus BlockOutput( ) = 0;
        virtual ErrorStatus BlockDerivative( ) = 0;
        virtual ErrorStatus BlockUpdate( ) = 0;
        ...
    private:
        BlockGraphicalData blkGraphicalAttributes;
        BlockFunctionalData blkFunctionalAttributes;
        BlockCompiledData blkCompiledAttributes;
        BlockExecutionData blkExecutionData;
        ...
};
```

Although the example of the data structure above is written in C++, those skilled in the art will recognize that equivalent data structures written in other languages, such as a structured language or another object oriented language may also be used. The major data fields of the block data structure fall into four categories. For example, a graphical attributes field, a functional attributes field, a compiled attributes field and an execution data field.

The graphical attributes field is responsible for storing information relevant for graphical rendering of the block within its parent graphical model's GUI. Attributes specific to the block icon such as font, color, name, and icon-image are stored in this field. It should be noted that modifying these attributes does not affect the dynamics of the model using this block. The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of given block in a model.

Attributes of block ports specify properties of the information that is either available to or produced at that port. For example, Block port attributes are listed in Table I below.

TABLE I

Dimensions
Data Types
Sample Rates
Direct Feed Through
Complexity

Dimension attributes are individual dimension sizes of a multi-dimensional array that are used as a container for data elements. Data type attributes are the data type of each element of data in the data container. A complexity attribute is a flag to specify if each data element is real or complex. A sample rate attribute specifies how and when the signal corresponding to an input or output port will be used. The port sample times may sometimes be used to implicitly infer the block's sample time. The direct feed through attribute is specified only for input ports and indicates whether the Output, the GetTimeOfNextHit, or both equations of the block are a function of the given input. This attribute helps in determining the sequence in which block methods should be executed while executing the graphical model.

The compiled attributes field of the block data structure holds the attributes of the block and its ports that minor the functional attributes listed above. This field is filled in during graphical model compilation by utilizing the functional attributes of the block in conjunction with the functional and compiled attributes of the blocks that are connected to it. This process of determining the compiled attributes from the functional attributes is termed attribute propagation or signal propagation. Attribute propagation is described in greater detail below in the section on graphical model compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the graphical model editor in order to render the block appropriately in the GUI of its parent graphical model. For instance, this set of methods may include a BlockDrawIcon method that determines the shape the block icon has on the GUI. Methods used in compilation are methods that are called by the graphical model compilation engine. They help validate the connections of the block to other blocks on the graphical model.

The methods used in execution include a number of different run-time methods that are required for execution. These include the BlockOutput, BlockUpdate, BlockDerivative methods that realize the Output, Update, and Derivative equations often found in the context of dynamic systems. In addition, to these methods Simulink® includes several other run-time methods, such as the Jacobian, Projection, ZeroCrossings, Enable, Disable, Initialize, EvalParams (check and process parameters), and GetTimeOfNextHit methods. It should be noted that there is no explicit method for algebraic equations because these are represented and processed in a different manner.

Once a graphical model has been constructed using the editor, an execution engine allows the model to be solved in order to trace the system outputs as a function of time. The solution of the model, which may be referred to as model execution, is carried out over a user-specified time span for a set of user-specified inputs. Simulation proceeds in four major stages: compilation, link, code generation, and the simulation loop.

FIG. 2B illustrates an environment suitable for practicing an illustrative embodiment of the present invention. A computer system 60 includes an electronic device 62, a network 66, such as the Internet, an intranet, or other suitable network either wired, wireless or a hybrid of wired and wireless, and, optionally, a server 64 or other electronic device. The electronic device 62 includes a microprocessor 68 for executing various instructions from an executable program and controlling various hardware and software components. The electronic device 62 also includes a display device 70 for use in rendering textual and graphical images, a storage device 76 for storing various items such as an interface 80, build tool 86, and a graphical model environment 78.

The storage device 76 can also store a registry 82 for registering various properties or characteristics of blocks and signals with the graphical model environment 78, and a library 84 to serve as a repository of block types and signal types that currently exist in the graphical modeling environment 78. The registry 82 in conjunction with the interface 80 allows a user to register with the graphical model environment 78 signals that have a variable data dimensionality the dimensions of which and the size of which can change as a block diagram executes in the graphical modeling environment 78. Those skilled in the art will appreciate that the illustration of the interface 80, the registry 82, the library 84 and the build tool 86, is merely illustrative and these elements can be physically or logically located in the graphical modeling environment 78.

In an exemplary embodiment, the graphical modeling environment 78, such as a graphical modeling environment like Simulink® from the MathWorks, Inc. of Natick, Mass., provides a graphical and interactive environment by which engineers and other designers can use a model-based design approach to design and develop code for a computational hardware device. With a model-based design approach, the graphical modeling environment 78 allows a block diagram model to be an implementation specification for automatically generating code. As such, design changes to the model can be quickly updated in the design model, evaluated by simulation and then automatically reflected in the generated code.

The graphical modeling environment 78 includes the code build tool 86 to generate code for the implementation of the design represented by a block diagram model. In brief overview, the code build tool 86, such as a code building tool like Real-Time Workshop® from the MathWorks, Inc. of Natick, Mass., generates and executes stand-alone source code, such as the C programming language, for models created with the graphical modeling environment 78, such as a graphical modeling environment 78 provided by Simulink®. The code build tool 86 can generate source code for the model or for subsystems of the model, compile the source code into object code, and build an executable program. The code may be designed to run on any processor, microprocessor, operating system, computational hardware or component of a computational hardware. Additionally, the code may be customized to run on a specific target hardware platform.

The code build tool 86 obtains a block diagram model from the graphical modeling environment 78 along with other information and translates the blocks of the block diagram model to build or generate source code representing the functionality of the configured blocks in the block diagram model. The other information can be held, for example, in one or more files and include, templates, commands, input parameters, configuration data, source code, data and class definitions, and any other like information. The electronic device 62 also includes a keyboard 72 and a pointing device 74, such as a mouse, trackball, or lightpen. The graphical modeling environment 78 will be described below for illustrative purposes based on Simulink® from The MathWorks, Inc. of Natick, Mass. Nevertheless, those skilled in the art will appreciate that the principles and concepts described below are equally applicable to other graphical modeling environments, such as LabView, System View, Signal Processing Workstation, HyperSignal, COSSAP, Angeles, Ptolemy and other like graphical model environments. The interface 80 programmatically registers the various signal data dimensionalities defined by a user with the registry 82 and thus the graphical modeling environment 78.

FIGS. 2A and 2B further illustrate a computational hardware device 100 that includes a target device 102 for use in executing code generated from a block diagram model in the graphical modeling environment 78 that includes a signal with a variable or dynamic data dimensionality, a variable or dynamic data size, or both. The signal being capable of varying in one or more dimensions and size between two time instances during execution of the block diagram model without using graphical connections to convey the dimension and size information to blocks associated with the signal. The computational device 100 is capable of communicating directly with the network 66 or with the electronic device 62. The computational device 100 is also capable of indirectly communicating with the network 66 through the electronic device 62. The target 102 can be configured as a processor, a microprocessor, a digital signal processor (DSP), and application specific integrated circuit (ASIC), a field programmable gate array (FPGA), a service processor, a controller, or other like hardware device capable of carrying out one or more instructions in a defined manner.

Definitions of signal classes, and hence a complete signal class inheritance hierarchy, may be accomplished explicitly in the context of the graphical modeling environment by use of a registry or other means to retain class definition declarations. Alternatively, the definitions are declarable and retained in a separate environment that is equipped with interfaces to access the definitions directly from the graphical modeling environment. MATLAB® is an example of an environment in which signal class definitions may be declared and instanced by means of a textual description language and a suitable type repository.

Nonetheless, those skilled in the art will recognize that other programming applications and environments are well suited to act as a repository or define a signal class hierarchy even if interfaces need to be defined and developed to share class definitions and object instances with the illustrative graphical modeling environment 78. Furthermore, those skilled in the art will recognize that the interface 80 can take the form of a graphical user interface that provides a user of the system 60 with textual and graphical information to allow the user to browse, select, create, and modify the signal classes and the signal sub-classes of the graphical modeling environment 78. Those skilled in the art will appreciate that the interface 80 is also implementable as a command line interface or other suitable interface that allows a user to register a newly defined signal class or signal sub-class (i.e., newly defined signal type) or to define or specify the data dimensionality and size of a signal with the graphical modeling environment 78.

The server 64 coupled to the network 66 is adaptable to include the code build tool 86'. In this manner, a number of users are able to access the code build tool 86' via the network 66 to build or generate source code from a block diagram model with one or more signals having data dimensions and size that vary during execution of the model where the model is free of graphically visible connections to convey the dimension and size information to blocks in the model. Those skilled in the art will recognize that the electronic device 62 includes other software such as other interfaces and other programs, such as one or more OS programs, compilers and various other program applications developed in a variety of programming environments for controlling system software and hardware components.

The illustrative embodiment of the present invention may adopt an object oriented (OO) programming model. In an object oriented programming environment an object is a software artifact that has attributes and behaviors. Behaviors are also referred to as functions or methods. Object classes are arranged in a hierarchy with a parent class located at a root of the hierarchy tree with sub-classes extending therefrom. Each sub-class or child class is derived from, and inherits attributes and methods from another class such as, a parent class. Thus, an instance of a sub-class is also an instance of its parent class.

Although the illustrative embodiment of the present invention is discussed herein in accordance with the concepts and principles of an object oriented framework those skilled in the art will recognize that the illustrative concepts discussed herein are applicable to other programming frameworks such as structured programming frameworks including C, Fortran and the like, or in hybrid programming frameworks having OO properties and structured properties such as C#.

Figure 5:
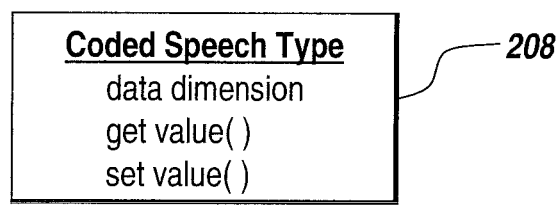
FIG. 5 illustrates more detail of the exemplary signal illustrated in FIGS. 3A-3C and 4A-4B.

FIGS. 3A, 3B, 3C, and 5 illustrate the principle of a signal having a data dimensionality attribute that is defined or specified to allow the data dimensionality and data size of the signal to vary during execution of a block diagram model in a graphical modeling environment 78 without using separate graphically visible connectors to a block to convey the data, the dimensionality of the data, and the size information thereto. In the illustrative embodiment of the present invention, signals in the graphical modeling environment 78 are objects belonging to one or more classes. For example, a class 208 as illustrated in FIG. 5. Class 208 is a parent class of a signal or signal type containing attributes and operations. Instantiation of an object of the class 208 represents a signal type, for example, an N-dimensional signal type includes an attribute "data dimension" and operations defined for reading and writing a value. Those skilled in the art will appreciate that other parent classes can be defined for other signals having a data dimension attribute that allows the data dimensions and data size of the defined signal to vary as the block diagram model executes in the graphical model environment 78 without using separate graphically visible connections to convey the data, the dimensionality of the data, and the size information.

Figure 3A:
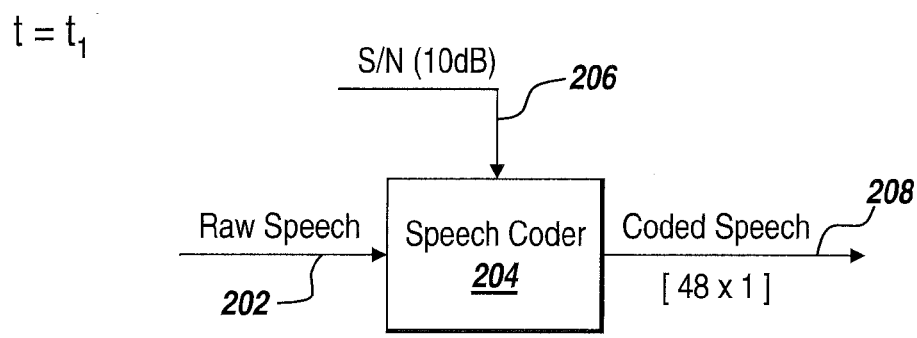
FIG. 3A illustrates a first time instance of signal with a variable data dimensionality and/or data size in an exemplary graphical modeling environment.
Figure 3B:
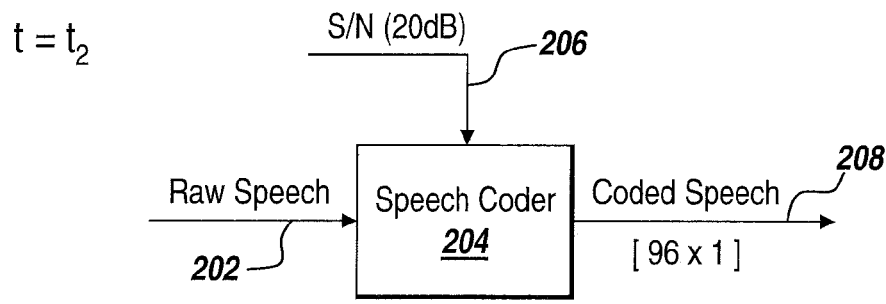
FIG. 3B illustrates a second time instance of signal with a variable data dimensionality and/or data size in an exemplary graphical modeling environment.
Figure 3C:
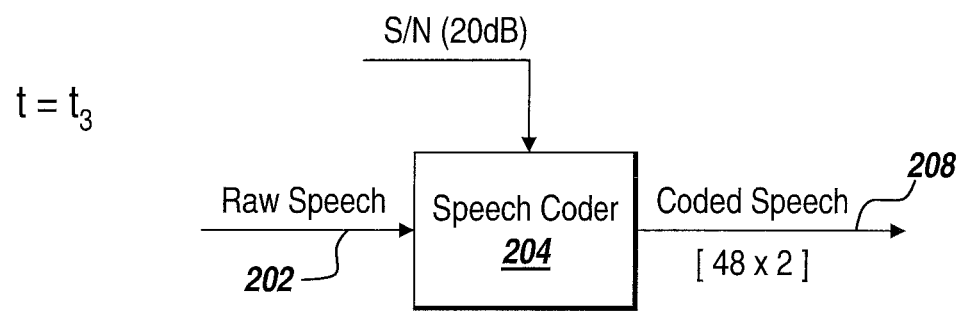
FIG. 3C illustrates a third time instance of signal with a variable data dimensionality and/or data size in an exemplary graphical modeling environment.

FIGS. 3A-3C illustrate how a block created in the graphical modeling environment 78 supports and propagates a signal that represents a signal type having a data size and dimensionality capable of varying as the block in a block diagram model executes. Speech coder block 204 includes a first input port to receive a raw speech signal 202, a second input port to receive a signal to noise ratio signal 206, and an output port to propagate a coded speech signal 208. Speech coder block 204 operates on raw speech data provided by the raw speech signal 202 to produce coded speech data for the coded speech signal 208. Coded speech signal 208 has a data size and a data dimensionality that can vary at each time instance during execution of a block diagram model.

For example, FIG. 3A illustrates that at time $t_1$ the signal to noise ratio signal 206 has a value of 10 decibels (dB), which drives the speech coder block 204 to use forty-eight samples at its output to represent the input data associated with raw speech signal 202.

However, FIG. 3B illustrates that at time $t_2$ the value of the signal to noise ratio signal 206 changes to 20 dB, which drives the speech coder block 204 to use ninety-six samples at its output to represent the input data associated with the raw speech signal 202 as coded speech. More specifically, the operation of the speech coder block 204 at time $t_2$ on the data from the raw speech signal 202 increases or doubles the size of the data of the coded speech output signal 208 from time $t_1$, and the speech coder block 204 as well as coded speech signal 208 are capable of handling the increase in data size without using graphical connections to convey the dimension and size data. Nevertheless, those skilled in the art will appreciate that the size of the data of the coded speech signal 208 could have decreased at time $t_2$ if, for example, the value of the signal to noise ratio signal 206 changed from 10 dB to 5 dB.

FIG. 3C illustrates that at time $t_3$ the value of the signal to noise ratio signal 206 remains at 20 dB, which drives the speech coder block 204 to use ninety-six samples at its output to represent the input data associated with the raw speech signal 202 as coded speech. More specifically, the operation of the speech coder block 204 at time $t_3$ on the data from the raw speech signal 202 increases or doubles the size of the data of the coded speech output signal 208 from time $t_1$, and the speech coder block 204 as well as coded speech signal 208 are capable of handling the increase in data size by changing the dimensionality of the coded speech signal 208 from a 1-Dimensional signal to a 2-Dimensional signal without using a separate graphical connection to convey the dimension and size data. Nevertheless, those skilled in the art will appreciate that the dimensionality of the data of the coded speech signal 208 could have decreased from, for example, a 2-Dimensional signal to a 1-Dimensional signal at time $t_3$ if, for example, the value of the signal to noise ratio signal 206 changed from 10 dB to 5 dB. In the illustrative embodiment of the present invention, the speech coder block 204 is the source block for the coded speech signal 208. That is, the coded speech signal 208 originates at the speech coder block 204.

Moreover, those skilled in the art will appreciate that at any time instance the data size and dimensionality of the coded speech signal 208 can increase, decrease, or remain the same depending on the operation of the speech coder block 204 on the data of the raw speech signal 202 and the dB value of the signal to noise ratio signal 206. Those skilled in the art will recognize that the use of the signal to noise ratio signal 206 to trigger a change in the data dimensionality and data size of a signal is meant to be illustrative and not limiting of the present invention. Furthermore, those skilled in the art will appreciate that a data structure of a signal can include one or more datatypes. For example, integer datatype, double precision datatype, user defined datatype, composite datatype defined by two or more datatypes, and the like.

Those skilled in the art will also appreciate that in accordance with the present invention a block can also receive a signal type having a variable data dimensionality and size and when the block completes performance of a predefined operation on the features of the signal the block can output a signal type having a fixed or static data dimensionality and data size or a variable data dimensionality and data size. Likewise, a block can receive a signal type having an attribute that identifies a fixed or static data dimensionality and the block upon completion of the predefined operation on the features of signal can output a signal type having an attribute that identifies a signal type with a data dimensionality and data size that can vary without using connections to convey the data dimension and the data size to blocks associated with the signal.

The present invention is well suited for use with "atomic" blocks in the graphical modeling environment 78 as well as with subsystems in the graphical modeling environment 78. That is, the depicted speech coder block 204 can be an "atomic" block, a "composite" block, or can be a subsystem. As used herein a block is referred to as "atomic" if its functional definition is outside the context of the model in which it is placed. For example, Simulink® has a set of predefined atomic blocks (e.g. Sum, Product, Gain), and the user can also create their own atomic blocks through user-written "S-functions". Being atomic, S-functions' functional definitions are specified outside the context of the model, for example using C code or MATLAB "m" code. A "composite" block is a block whose functional definition is specified through the model, using sets of atomic and composite blocks. Simulink® permits the user to specify "subsystems", composite blocks whose definition consists of interconnected sets of predefined blocks, user-written S-functions, and other Simulink® subsystems. Subsystems can be nested hierarchically, defining a "model hierarchy."

Figure 4A:
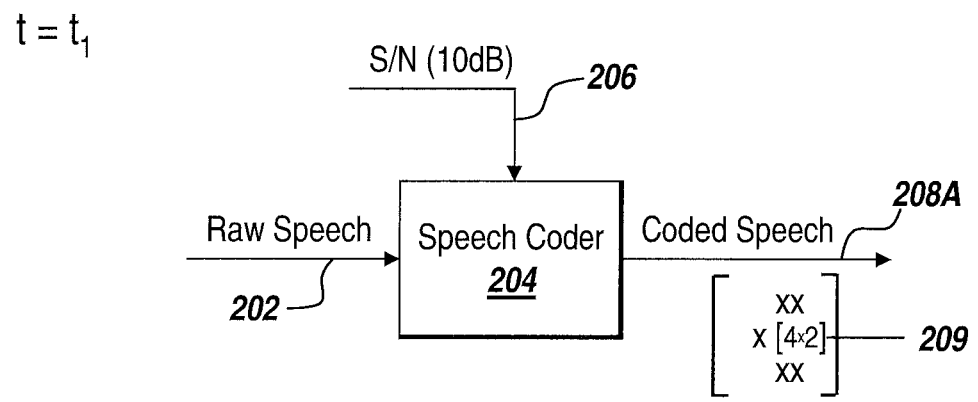
FIG. 4A illustrates at a first time instance a signal with a data element having a variable data dimensionality and/or data size in an exemplary graphical modeling environment.
Figure 4B:
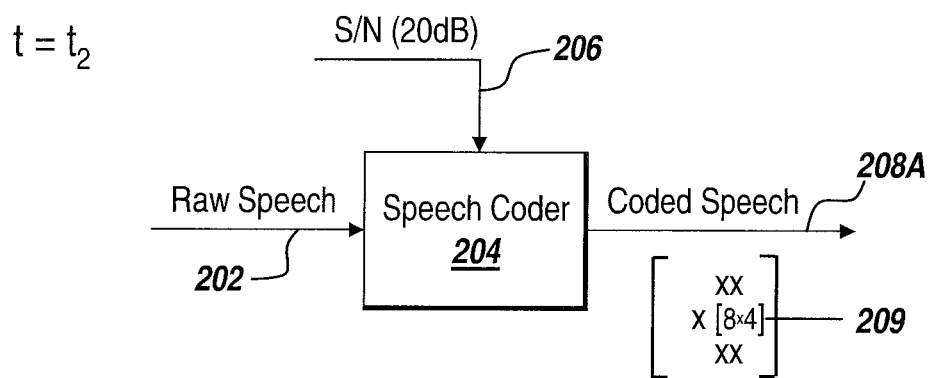
FIG. 4B illustrates at a second time instance a signal with a data element having a variable data dimensionality and/or data size in an exemplary graphical modeling environment.

FIGS. 4A, 4B, and 5 illustrate the principle of a signal having a data dimensionality attribute that is defined or specified to allow a data element of the signal to vary in dimension or size or both during execution of a block diagram model in a graphical modeling environment 78 without using separate graphically visible connectors to a block to convey the data, the dimensionality of the data element, and the size information thereto. In the illustrative embodiment of the present invention, signals in the graphical modeling environment 78 are objects belonging to one or more classes. For example, a class 208 as illustrated in FIG. 5. Class 208 is a parent class of a signal or signal type containing attributes and operations. Instantiation of an object of the class 208 represents a signal type, for example, an N-dimensional signal type includes an attribute "data dimension" and operations defined for reading and writing a value. Those skilled in the art will appreciate that other parent classes can be defined for other signals having a data dimension attribute that allows the data dimensions and data size of the defined signal to vary as the block diagram model executes in the graphical model environment 78 without using separate graphically visible connections to convey the data, the dimensionality of the data, and the size information.

FIGS. 4A and 4B illustrate how a block created in the graphical modeling environment 78 supports and propagates a signal that represents a signal type having a data element with a size and dimensionality capable of varying as the block in a block diagram model executes. Speech coder block 204 includes a first input port to receive a raw speech signal 202, a second input port to receive a signal to noise ratio signal 206, and an output port to propagate a coded speech signal 208A. Speech coder block 204 operates on raw speech data provided by the raw speech signal 202 to produce coded speech data for the coded speech signal 208A. Coded speech signal 208A includes a data element 209 having a data size or a data dimensionality, or both that can vary at each time instance during execution of a block diagram model.

For example, FIG. 4A illustrates that at time $t_1$ the signal to noise ratio signal 206 has a value of 10 decibels (dB), which drives the speech coder block 204 to output coded speech signal 208A with data element 209 being a 2-dimensional matrix with a size of four for the first dimension and a size of two for the second dimension. Coded speech signal 208A represents the input data associated with raw speech signal 202.

However, FIG. 4B illustrates that at time $t_2$ the value of the signal to noise ratio signal 206 changes to 20 dB, which drives the speech coder block 204 to use ninety-six samples at its output to represent the input data associated with the raw speech signal 202 as coded speech. The operation of the speech coder block 204 at time $t_2$ on the data from the raw speech signal 202 increases or doubles the size of the data element 209 in both dimensions from time $t_1$. The speech coder block 204 as well as coded speech signal 208A are capable of handling the increase in data size without using graphical connections to convey the dimension and size data.

Nevertheless, those skilled in the art will appreciate that the size of the data element 209 of the coded speech signal 208A could have decreased at time $t_2$ if, for example, the value of the signal to noise ratio signal 206 changed from 10 dB to 5 dB.

Nevertheless, those skilled in the art will appreciate that the dimensionality of the data of the coded speech signal 208 could have decreased from, for example, a 2-Dimensional signal to a 1-Dimensional signal at time $t_3$ if, for example, the value of the signal to noise ratio signal 206 changed from 10 dB to 5 dB. In the illustrative embodiment of the present invention, the speech coder block 204 is the source block for the coded speech signal 208. That is, the coded speech signal 208 originates at the speech coder block 204.

Moreover, those skilled in the art will appreciate that at any time instance the data size and dimensionality of data element 209 of the coded speech signal 208A can increase, decrease, or remain the same depending on the operation of the speech coder block 204 on the data of the raw speech signal 202 and the dB value of the signal to noise ratio signal 206. Those skilled in the art will recognize that the use of the signal to noise ratio signal 206 to trigger a change in the data dimensionality and data size of a signal is meant to be illustrative and not limiting of the present invention.

Figure 6:
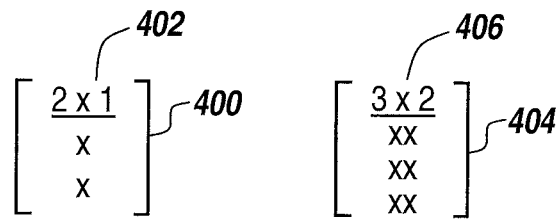
FIG. 6 illustrates more detail of the exemplary signal illustrated in FIGS. 3A-3C and 4A-4B.

FIG. 6 illustrates an exemplary representation of a data structure associated with a signal type, for example, coded speech signal 208 having a data dimensionality and size that can vary during execution of a block diagram model. Data representation 400 and data representation 404 each include a header portion 402 and 406, respectively, readable by a block receiving the signal type to identify the dimensionality and size of the data. Data representation 400 includes header portion 402 to identify data representation 400 as a 1-Dimensional signal with a size of two. In similar fashion, data representation 404 includes a header 406 to identify data representation 404 as a 2-Dimensional signal with a size of 3×2. In this manner, a block receiving a variable dimension signal type can read the header information identifying the data dimensionality and data size of the signal. Having the data dimensionality and data size of the signal propagate with the data allows a block to allocate memory space in a real time fashion according to the header information of the data. Those skilled in the art will appreciate that the two-by-one matrix and the three-by-two matrix headers are merely illustrative and other sizes and dimensions are possible.

Those skilled in the art will appreciate that the data structures discussed in relation to FIG. 6 are illustrative and not meant to limit the scope of the present invention. For example, the data values along with the data dimensions and the data size do not need to be collocated in the same data structure rather, the data values can be associated with a first signal and the data dimensionality and data size can be associated with a second signal not graphically visible in a model.

Figure 7:
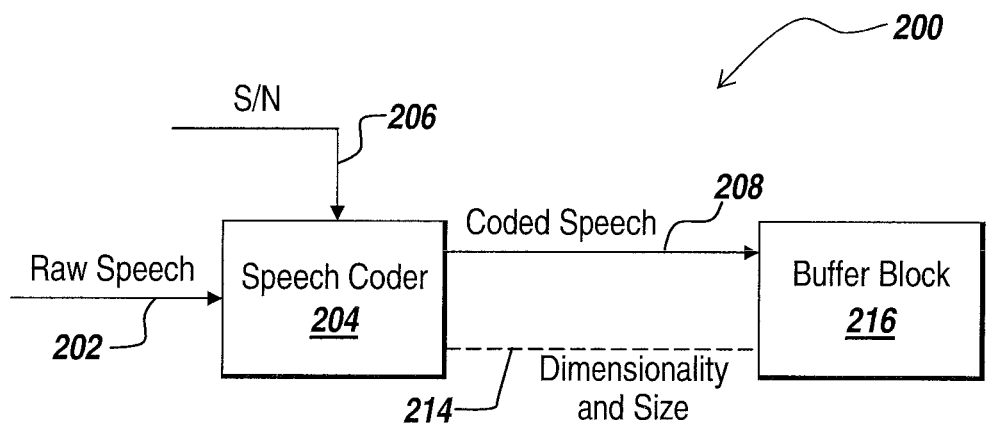
FIG. 7 illustrates an exemplary block diagram model illustrating a variable data dimensionality of the signal in FIGS. 3A-3C and 4A-4B in an exemplary block model diagram.

FIG. 7 illustrates an exemplary block diagram model 200 having a signal 214 not graphically rendered in the model. Signal 214 is used to convey data dimensionality and data size of the coded speech signal 208 to the buffer block 216. The signal 214 defines or specifies to the buffer block 216 the data dimensionality and the data size of the coded speech signal 208 at each time instance speech coder block 204 outputs such a signal. For example, at time $t_0$ signal 214 identifies to the buffer block 216 that the data dimensionality and data size of the coded speech signal 208 is 48×1 and at time $t_2$, signal 214 is used to identify to the buffer block 216 that the data dimensionality and data size of the coded speech signal 208 outputted by the block 202 is 96×1. Signal 214 is illustrated in a dashed line to illustrate that such a signal is not graphically rendered and as such not visible in a model.

In one embodiment of the present invention, the buffer block 216 is a sink block where the coded speech signal 208 terminates.

In operation, once a user has defined or specified the attributes of the signal in the graphical modeling environment 78, the compiling of the block diagram model evaluates the signal and block attributes and parameters, and propagates the signal attributes to each of the blocks in the block diagram model. As such, during compilation, information is given or made available to each block that identifies a location for the data associated with the signal, as well as given dimensionality characteristics for that signal. More specifically, if the data dimensionality and data size of the signal can vary during execution of the block diagram model, compilation of the model identifies to each block the variable characteristics of the signal's data dimensionality and data as well as, if desirable, the maximum dimensions of the data. In this manner, each block in the block diagram model can insure sufficient memory or data storage to accommodate the maximum data possible for the signal.

Those skilled in the art will appreciate that the concepts and operations of the present invention apply to "N" dimensional data. That is, one dimensional data, for example a vector; two dimensional data, for example a matrix; three dimensional data, for example a data cube; and four dimensional data, for example a hologram changing in time or a three-dimensional cube having a fourth parameter such as color and the like.

Those skilled in the art will recognize that code can be generated from the graphical modeling environment 78 for execution on a platform in another environment. Further, the variable data dimensionality and data size of a signal and the associated memory allocation in the graphical modeling environment 78 is translatable to code for execution on the platform in another environment. As such, the variable data dimensionality and data size of a signal in the block diagram model without a graphical connection to convey the dimension and size information to an associated block of the graphical modeling environment 78 and the memory allocation techniques can be translated into source code. Hence, another environment can perform the functionality of the block diagram model with data having data dimensions and data sizes that vary during execution and with memory allocation that is fixed, or with memory allocation that varies during execution of the code on a platform external to the graphical modeling environment 78.

One exemplary technique for generating code from the block diagram model in the graphical modeling environment 78 is to the use of an automatic code generator, such as Real Time Workshop® available from the MathWorks, Inc., of Natick, Mass. Other examples include products that generate HDL code from Simulink®, such as DSP Builder available from Altera of San Jose, Calif., or System Generator for DSP available from Xilinx of San Jose, Calif. Other products with similar functionality that do not use Simulink® include Direct DSP available from SignaLogic of Dallas, Tex.

Real-Time Workshop® uses target language compiler script files, with a .tlc file extension, as input files to the code generation process. The .tlc files provide sections of programming instructions to be implemented for block references as they may be found in a block diagram model during the code generation process. The .tlc files also can provide data and class definitions for data element references found in the block diagram model. Additionally, the .tlc files also comprise compiler directives, built-in functions, and other code generation commands to direct Real-Time Workshop® during the code generation process. Nevertheless, those skilled in the art will recognize that Real-Time Workshop® can use formats other than .tlc in addition to .tlc files.

In one aspect, the present invention relates to the automatic code generation of block diagram model such as the block diagram model 200 illustrated in FIG. 7. The code build tool 86, such as Real-Time Workshop®, generates code to implement the block diagram model 200 including signal 208 on the target device 102 of the computational hardware device 100.

Figure 8:
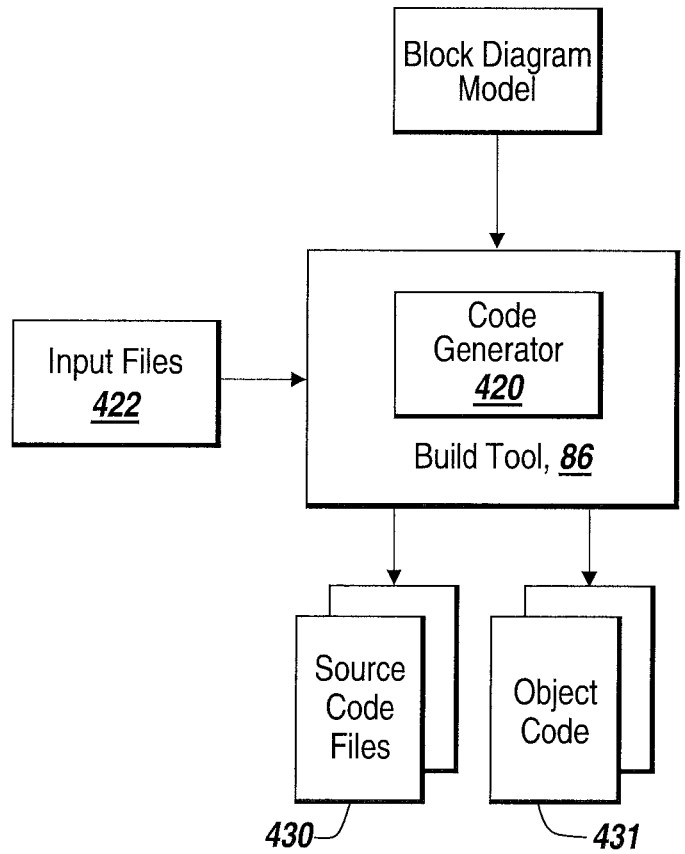
FIG. 8 illustrates in more detail generation of code in accordance with the teachings of the present invention.

FIG. 8 depicts an illustrative embodiment of the code build tool 86. In brief overview, the code build tool 86 includes a code generator 420 that obtains the block diagram model 200 and may obtain one or more input files 422 to be used to automatically generate source code files 430 and object code files 431 from the block diagram model 200.

In operation, the code generator 420 reads in the block diagram model 200 and the input files 422 to generate source code by files 430 translating the block diagram model 200 including the variable data dimensionality and memory allocation schemes (i.e., fixed or variable) into one or more source code files 430. By way of example, the automatic code generation can be discussed in terms of generating code with Real-Time Workshop® from a block model diagram generated with Simulink®. Simulink® creates and stores block diagram models into model files with an .mdl file extension. As part of the code generation process, Real-Time Workshop® reads in an .mdl model file and analyzes the model to generate an intermediate model file with an .rtw extension. This intermediate .rtw model file includes a hierarchical structure of records describing systems and their blocks and connections analyzed from a block diagram model of the .mdl file.

The block diagram model 200 provided by the graphical modeling environment 78 includes at least one signal having a data dimensionality and data size that can vary between a first time instance and a second time instance during execution of the block diagram model 200, without the block diagram model 200 using graphical connections to convey the data size and data dimension information to blocks associated with the signal. In other embodiments of the present invention, the block diagram model 200 is obtained from another graphical modeling environment, technical computing environment or otherwise generated with other software tools. The block diagram model 200 can include a file in a format that the code build tool 86 or code generator 420 can read and that follows a file specification for defining coded speech signal 208. In other embodiments of the present invention, the code generator 420 can obtain the block diagram model 200 from an application programming interface (API) call to another application or via an interface to another environment. In yet a further embodiment of the present invention, the graphical modeling environment 78, or another computer program, saves and converts the block diagram model 200 into a format readable by the code build tool 86.

The one or more input files 422 can include files including templates, commands, input parameters, configuration data, source code, data and class definitions, component configuration, device driver or any other information that may be used by the code generator 420 to generate code from the block diagram model 200. The input files 422 can include files to provide input to and configure the code generator 420 to generate source code files 430 for a specific target hardware platform, for example, a specific processor. In an exemplary embodiment of Real-Time Workshop® as the code generator 420, Real-Time Workshop® uses target language compiler script files, with a .tlc file extension, as input files 422 to the code generation process. The .tlc files provide sections of programming instructions to be implemented for block references as they may be found in the block diagram model 200 during the code generation process. The .tlc files can also provide data and class definitions for data element references found in the block diagram model 200. Additionally, the .tlc files also comprise compiler directives, built-in functions, and other code generation commands to direct Real-Time Workshop® during the code generation process.

A language compiler called the target language compiler of Real-Time Workshop® works with .tlc files and .rtw files to produce code. The target language compiler interprets a program that reads the intermediate model file description of an .rtw file. As the target language compiler encounters a record in the .rtw file, it uses directives in the .tlc files corresponding to the record to direct the code generation process for the specific record. As such, the target language compiler works much like a text processor. For example, the target language compiler uses block .tlc files, which specify the particular code for a block, to transform each block into code. When it reads a record in the .rtw file that references a block, the target language compiler applies code from the corresponding block .tlc file to generate code for the block in source code files 422. Additionally, model wide .tlc files are also used to provide input to the target language compiler for global customization of the code. Model wide .tlc files may direct the target language compiler to generate main routines to provide entry points into the program, source code header files to setup data structures, and utility functions to support code for particular blocks. The block and model wide .tlc files can be modified to generate customized code for blocks and to generate any desired global customizations to the code.

The source code files 430 generated from the code generator 420, such as Real-Time Workshop®, may comprise program instructions of a programming language, such as C, which may further be in a format and style following the ANSI/ISO C standard. Additionally, the source code files 430 may be generated to comprise fixed-point or floating-point source code. The programming instructions of the source code files 430 can be generated to run on any real-time operating system or for a specific processor. In a further embodiment of the present invention, the programming instructions of the source code files 430 may be adopted for a desired performance for a specific target hardware platform or both. In one embodiment of the present invention, the code generator 420 can be configured via the input files 422 to generate custom source code having a style and format as directed by the input files 422. The code generator 420 can also be configured via the input files 422 to provide customized source code to support such customizations as error handling, optimization, code and data reduction, code reusability, scoping of variables, and other characteristics of the source code that may be modified during the source code generation process.

The code build tool 86 also provides for the building of the source code files 430 into object code 431 to generate one or more programs to run on the target components. The build process can include compiling the code and linking libraries, drivers and other programs via a make program or some other compiling utility. In one embodiment, the code building tool invokes a compiler provided by software available with the operating system, such as a make utility on a UNIX operating system. In another embodiment, the compiler may be provided from a software development package such as Visual C/C++ from Microsoft. One ordinarily skilled in the art will recognize the code build tool 86 may invoke any type of compiler that is configured to and capable of translating the source code into object code to be executed by the target computation device. In another embodiment, the code generator 420 may allow the linking of a user provided device driver when compiling the source code 430 into object code 431. Additionally, the build process provided by the code build tool 86 may include downloading or otherwise transmitting the executable to the target device 102 via an editor, debugger, or download utility.

Although the illustrative embodiment of the present invention is discussed in terms of source code files 430 and object code 431 from a programming language like C, the code generator 420 may generate any type of programming related output, such as an interpreted programming language and scripting language. For example, the code generator 420 may generate code for Perl, VBscript, JavaScript, tlc, or the technical computing programming language of MATLAB®. In other cases, the code generator 420 may generate output in other types of languages, such as the hardware description language of HDL. One ordinarily skilled in the art will recognize the various types of languages the code building tool may apply in generating code and how the code generator may build the code based on the type of language.

Figure 9:
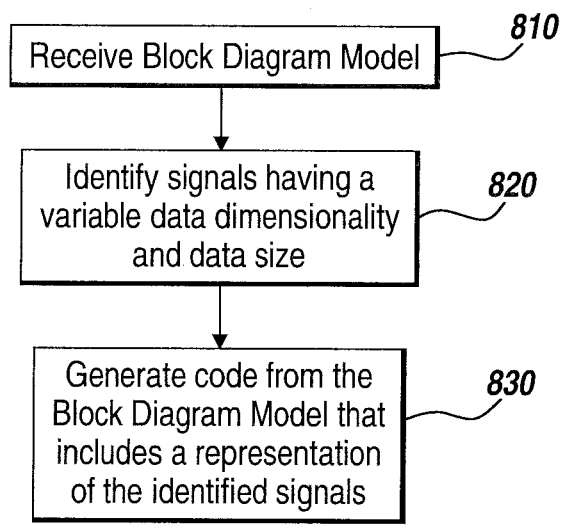
FIG. 9 is a block flow diagram illustrating steps taken in practicing the teachings of the present invention.

In another aspect, the present invention relates to a method for automatically generating code for interfaces between components of partitions. The flow diagram of FIG. 9 depicts another illustrative method for automatically generating code for a block diagram model 200. The method includes a step 910 of receiving the block diagram model 215. The code build tool 86 can receive the block diagram model 200 by reading a block diagram model file or another file representing a preprocessed or intermediate representation of the block diagram model 200. In one embodiment, the block diagram model 200 is obtained by making an API call to another application, such as graphical modeling environment 78. In another embodiment, the graphical modeling environment 78 may trigger the code generation process by sending the block diagram model 200 to the code build tool 86 and requesting the code build tool 86 to initiate the code generation process.

In step 920, the code build tool 86 identifies the signals from the block diagram model having a variable data dimensionality and data size free of a graphical connection in the block diagram model used to convey the dimension and size information to associated blocks. In step 930, the code build tool 86 using the code generator 420 generates code from the block diagram model including code for the identified signals for use by the computational device 100 on target device 102.

The present invention allows implementation of signals as objects or other structures whose attributes are interpreted differently based on processing requirements of a block in a graphical modeling environment. As such, each block in the environment can propagate a received signal type with its associated data dimensionality unchanged, carry out one or more operations on the data of the received signal type to modify the dimensions of the data to output a signal with the same or different data dimensionalities than the received signal. To accomplish these benefits the interface 80 operates in conjunction with the graphical model environment 78 to assist in the management, and interpretation of the objects representing signals.

Examples of the use a signal with a variable data dimensionality and data size are listed below. The below identified examples are meant to facilitate the understanding of the present invention and are not meant to limit the invention to a particular embodiment or to a particular use or application.

Example I

Blob processing for video signals. For example, the monitoring and tracking of people around an ATM machine, an airport, or a secure entrance to a building or area of a building. The number of people being tracked varies as they enter and leave the scene. Similar problems occur with other tracking applications, such as radar and sonar.

Example II

Simulink® vectors are used to represent actual data packets specified in a communication standard. Some of these packets have a variable length. For example, the packet length of PLCP (physical layer convergence procedure) in 802.11b/a/g and 802.16 is determined dynamically at the media access control (MAC) and physical (PHY) layer (MAC/PHY) interface, and its value is stored in the packet header.

Example III

A radar system can dynamically change its transmitted pulse burst length to adjust its range and Doppler resolutions. Accordingly, the data vector length for each pulse can vary during the simulation. This requires variable signal length support from the model. The radar system can also change the number of targets it is tracking. This requires the model to allow the number of vectors/channels to change during simulation.

Example IV

Dynamic inversion control schemes can provide the capability on reconfiguration in the face of identified control surface failures. This scheme is used by the Joint Strike Fighter (JSF) program. In this scheme, the control effectiveness matrix must change size in the event of control surface failures. For example, a surface failure can result in a reduction of the number of columns in a data matrix.

Example V

Timing synchronization problems in communications systems often result in data having a varying size and dimensionality. For example, phase shift keying (PSK) with frames in the receiver. The transmitter generates symbols at rate 1/T1. After pulse shaping and transmission over a channel, the receiver samples the incoming signal at rate 1/T2 (usually greater than 1/T1). Based on this sampled waveform, a digital synchronization algorithm estimates symbol timing instants and outputs frames of N symbols for subsequent detection. The N-symbol frame period is unknown when the receiver model is constructed; it is determined dynamically by the synchronization algorithm. In other words, the number of symbols is unknown for a pre-specified frame period.

While the present invention has been described with reference to an illustrative embodiment thereof, one skilled in the art will appreciate that there are changes in form and detail that may be made without departure from the intended scope of the present invention as defined in the pending claims. For example, the interface 80 can be implemented programmatically or implemented as a graphical user interface or as a command line interface or other like interface. Furthermore, those skilled in the art will appreciate that concepts discussed herein are equally applicable to time based graphical modeling environments; data flow based graphical modeling environments; discrete event based graphical modeling environments, and other like graphical modeling environments.

What is claimed is:

1. A non-transitory computer-readable medium holding instructions executable by a processor, the instructions comprising:
   instructions that, when executed, cause the processor to:
      interact with a graphical model that includes;
         a block, and
         a connection representing a signal received by or output from the block, wherein:
            the signal is associated with an attribute,
            the attribute represents a size or a dimensionality of the signal, and
            the size or the dimensionality of the signal changes during an execution of the graphical model; and
      generate code from the graphical model, the generated code comprising:
         code representing the connection, the code representing the connection implicitly conveying the size or the dimensionality of the signal,
         code representing the block, the code representing the block:
            identifying that the attribute of the signal representing the size or the dimensionality of the signal is a variable attribute, and
            retrieving or setting the size or the dimensionality of the signal using the attribute at a plurality of times during the execution of the model, the retrieving or the setting occurring before reading information from the connection or writing information to the connection.

2. The computer-readable medium of claim 1, wherein the block is a first block and the model further includes a second block connected to the first block via the connection, and the instructions further cause the at least one processor to:
   generate an executable program from the code; and
   execute the executable program, where the first block sends the size or the dimensionality of the signal to the second block during execution of the executable program.

3. The computer-readable medium of claim 1, where the instructions further comprise:
   instructions causing the processor to:
   provide information regarding a variability of the size or the dimensionality of the signal to another block of the graphical model.

4. The computer-readable medium of claim 1, where the instructions further comprise:
   instructions causing the processor to:
   provide information regarding a maximum size or a maximum dimensionality of the signal to another block of the graphical model.

5. The computer-readable medium of claim 1, where the instructions further comprise:
   instructions causing the processor to:
   generate hardware description language (HDL) code.

6. A computer-implemented method, comprising:
   interacting, using a processor of a computer, with a graphical model that includes:
      a block, and
      a connection representing a signal received by or output from the block, wherein:
         the signal is associated with an attribute,
         the attribute represents a size or a dimensionality of the signal, and
         the size or the dimensionality of the signal changes during an execution of the graphical model; and
   generating code from the graphical model, where, in the generated code:
      code representing the connection implicitly conveys the size or the dimensionality of the signal,
      code representing the block identifies that the attribute of the signal representing the size or the dimensionality of the signal is a variable attribute, and
      based on the identifying, the code representing the block retrieves or sets the size or the dimensionality of the signal using the attribute at a plurality of times during the execution of the model, the retrieving or the setting occurring before reading information from the connection or writing information to the connection.

7. The method of claim 6, wherein the block is a first block and the model further includes a second block connected to the first block via the connection, the method further comprising:
   generating an executable program from the code; and
   executing the executable program, where the first block sends the size or the dimensionality of the signal to the second block during execution of the executable program.

8. The method of claim 7, where the first block sends the size or the dimensionality of the signal via a data structure that includes a header portion and a data portion, the header portion including the size or the dimensionality of the signal.

9. The method of claim 7, where the second block receives the size or the dimensionality of the signal from the first block and allocates memory space for the signal in real time.

10. The method of claim 5, where the block is an atomic block.

11. The method of claim 5, further comprising:
    compiling the code, where the compiling the code includes providing information regarding variability of the size or the dimensionality of the signal to another block of the graphical model.

12. The method of claim 6, further comprising:
    compiling the code, where compiling the code includes providing information regarding a maximum size or a maximum dimensionality of the signal to another block of the graphical model.

13. The method of claim 6, where the generating of the code includes generating hardware description language (HDL) code.

14. A device, comprising:
    a non-transitory memory configured to:
       store a graphical model that includes;
          a block, and
          a connection representing a signal received by or output from the block, wherein:
             the signal is associated with an attribute,
             the attribute represents a size or dimensionality of the signal, and
             the size or the dimensionality of the signal changes during an execution of the graphical model; and
    one or more processors configured to:
       generate code from the graphical model, where, in the generated code:
          code representing the connection implicitly conveys the size or the dimensionality of the signal,
          code representing the block identifies that the attribute of the signal representing the size or the dimensionality of the signal is a variable attribute, and
          based on the identifying, the code representing the block retrieves or sets the size or the dimensionality of the signal using the attribute at a plurality of times during the execution of the model, the retrieving or the setting occurring before reading information from the connection or writing information to the connection.

15. The one or more devices of claim 14, wherein the block is a first block and is connected to a second block via the connection, and the one or more processors are further configured to:
    generate an executable program based on the code, and
    execute the executable program, where the first block sends the size or the dimensionality of the one signal to the second block during execution of the executable program.

16. The one or more devices of claim 15, where the first block sends the variable size or the variable dimensionality of the signal via a data structure that includes a header portion and a data portion, the header portion including the variable size or the variable dimensionality of the signal.

17. The one or more devices of claim 15, where the second block receives the variable size or the variable dimensionality of the signal from the first block and allocates memory space for the signal in real time.

18. The one or more devices of claim 14, where the processor is further configured to provide information regarding the variable size or the variable dimensionality of the signal to another block of the graphical model.

19. The one or more devices of claim 14, where when generating the code, the one or more processors are configured to generate hardware description language (HDL) code.

* * * * *

UNITED STATES PATENT AND TRADEMARK OFFICE
CERTIFICATE OF CORRECTION

PATENT NO. : 8,756,046 B2  
APPLICATION NO. : 13/366915  
DATED : June 17, 2014  
INVENTOR(S) : Darel Allen Linebarger et al.

It is certified that error appears in the above-identified patent and that said Letters Patent is hereby corrected as shown below:

On the Title Page

Item (56), page 2, column 1, line 6, under "Other Publications", delete "IKACC" and insert --UKACC-- in lieu thereof.

Item (56), page 2, column 1, line 17, under "Other Publications", delete "Sience," and insert --Science,-- in lieu thereof.

Item (56), page 2, column 2, line 6, under "Other Publications", delete "Simuilink®" and insert --"Simulink®"-- in lieu thereof.

Item (56), page 2, column 2, line 13, under "Other Publications", delete "retreived" and insert --retrieved-- in lieu thereof.

In the Claims

Column 21, line 57, in claim 6, delete "includes:" and insert --includes;-- in lieu thereof.

Signed and Sealed this
Twenty-eighth Day of October, 2014

Michelle K. Lee
*Deputy Director of the United States Patent and Trademark Office*